Feb. 21, 1967  E. H. ERATH  3,304,739
COOLING SYSTEM FOR PASSENGER COMPARTMENTS OF VEHICLES
Filed Aug. 31, 1965  2 Sheets-Sheet 2

INVENTOR.
EDWARD H. ERATH
BY Max Geldin
ATTORNEY

United States Patent Office 3,304,739
Patented Feb. 21, 1967

3,304,739
COOLING SYSTEM FOR PASSENGER
COMPARTMENTS OF VEHICLES
Edward H. Erath, Los Angeles, Calif., assignor to Douglas Aircraft Company, Inc., Santa Monica, Calif., a corporation of California
Filed Aug. 31, 1965, Ser. No. 483,940
13 Claims. (Cl. 62—244)

This invention relates to a temperature control system for an enclosed zone or compartment occupied by people, and is particularly concerned with the provision of a cooling system for the passenger and/or operator compartments of vehicles, particularly of trucks and highway-tractor cabs, employing an expendable refrigerant such as liquid air or liquid nitrogen.

For the air conditioning of the operator or passenger compartments of vehicles such as automobiles and particularly trucks which are engaged in long distance hauling especially over long stretches of hot arid areas, there has been a growing demand for simple inexpensive cooling systems to avoid the expense and weight burden of conventional expansion-compression refrigeration equipment.

It is accordingly one object of the invention to provide an air conditioning system for operator and/or passenger compartments of vehicles employing relatively light weight, inexpensive equipment, in conjunction with an expendable refrigerant such as liquid air or liquid nitrogen.

A particular object of the invention is to provide a simple inexpensive air cooling or air conditioning system for operator cabs of trucks, employing a minimum of component parts, in conjunction with an expendable refrigerant such as liquid air or liquid nitrogen, carried in a tank or reservoir on the vehicle, and which reservoir, if desired, is removable or interchangeable, the overall system being relatively light weight.

Other objects and advantages will appear from the description below of the present invention.

Briefly, according to a preferred embodiment, the air cooling or air conditioning system of the invention is composed of a heat exchanger which is mounted in the compartment to be cooled, a reservoir or storage tank to contain a cryogenic fluid such as liquid air, liquid nitrogen, liquid oxygen or liquid carbon dioxide, at its boiling point, and suitable sensors, control, distribution, and air circulation equipment to maintain a desirable temperature range in the compartment by metering cryogenic fluid through such heat exchanger.

The invention system includes means for maintaining a safe pressure in the cryogenic liquid storage tank such that when the cooling system is not in operation excess pressure which may build up in such storage tank is released by venting a portion of the cryogenic fluid in gaseous form to the atmosphere, or such that when the air conditioning system is in operation and is metering cryogenic liquid to the heat exchanger in the occupied compartment, such excess pressure is relieved by passage of a portion of the fluid vapors through the liquid supply conduit to such heat exchanger. When the system is in operation gas pressure in the storage tank forces liquid through the liquid supply conduit in controlled amounts to the heat exchanger in the compartment to be cooled and evaporates therein and is discharged into ambient atmosphere, externally of such compartment, giving up its latent heat of vaporization and sensible heat to the air to be cooled. Where the cryogenic liquid employed is liquid air, according to another embodiment the liquid air can be vaporized and discharged directly into the atmosphere of the enclosed compartment occupied by human beings. The air temperature within the compartment which is occupied is maintained constant at a preset value by means of a thermostat which actuates a control valve in the liquid supply line. The system is provided with adequate lock-out switches that operate a safety valve in the liquid supply line, and which valve can be either pneumatically or electrically actuated, to prevent the system from dumping large quantities of cryogenic liquid through the heat exchanger when a door or window of the compartment is open, or in normal operation when the compartment is not occupied.

Particularly where, as in preferred operation, the cooling system of the invention employs liquid air as the cryogenic liquid, means are provided in conjunction with the liquid storage tank and which functions in conjunction with the above noted means for maintaining a safe pressure in the liquid storage tank, to maintain the proper balance of oxygen and nitrogen in the liquid air in such tank so as to prevent dangerous oxygen-rich mixtures being formed in such tank and discharged through the liquid supply line and the heat exchanger to the ambient atmosphere.

The invention will be understood more clearly from the description below of certain preferred embodiments thereof, taken in connection with the accompanying drawings wherein:

FIG. 4 illustrates another modification of the invention system.

Figure 1:
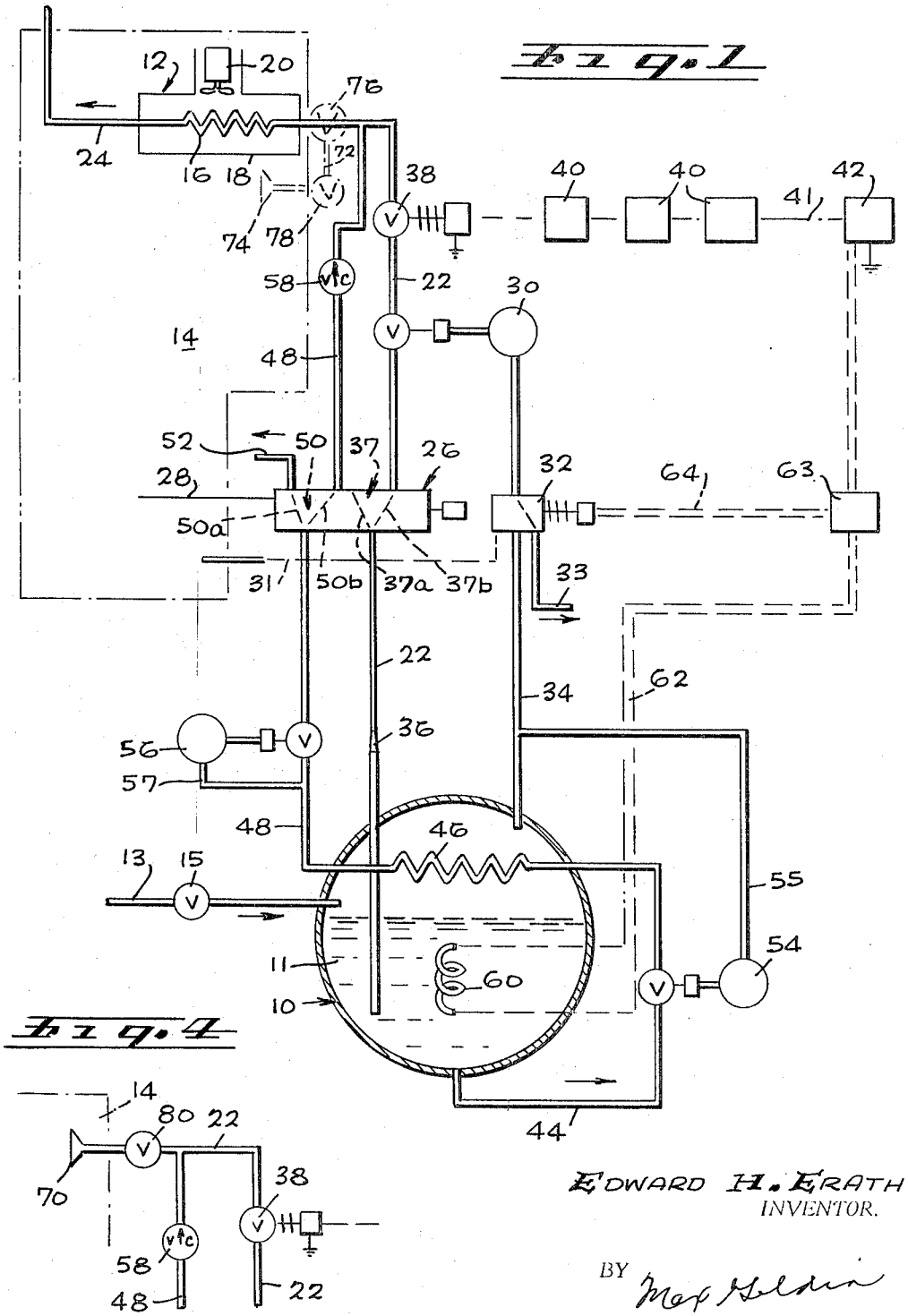
FIG. 1 shows a schematic arrangement of a preferred embodiment of the invention system.

Referring to the drawings, the air conditioning system shown in FIG. 1 is mounted on the truck tractor indicated at 9 in FIG. 1 for cooling or air conditioning the operator's cab thereof, indicated at 14.

Figures 2, 3:
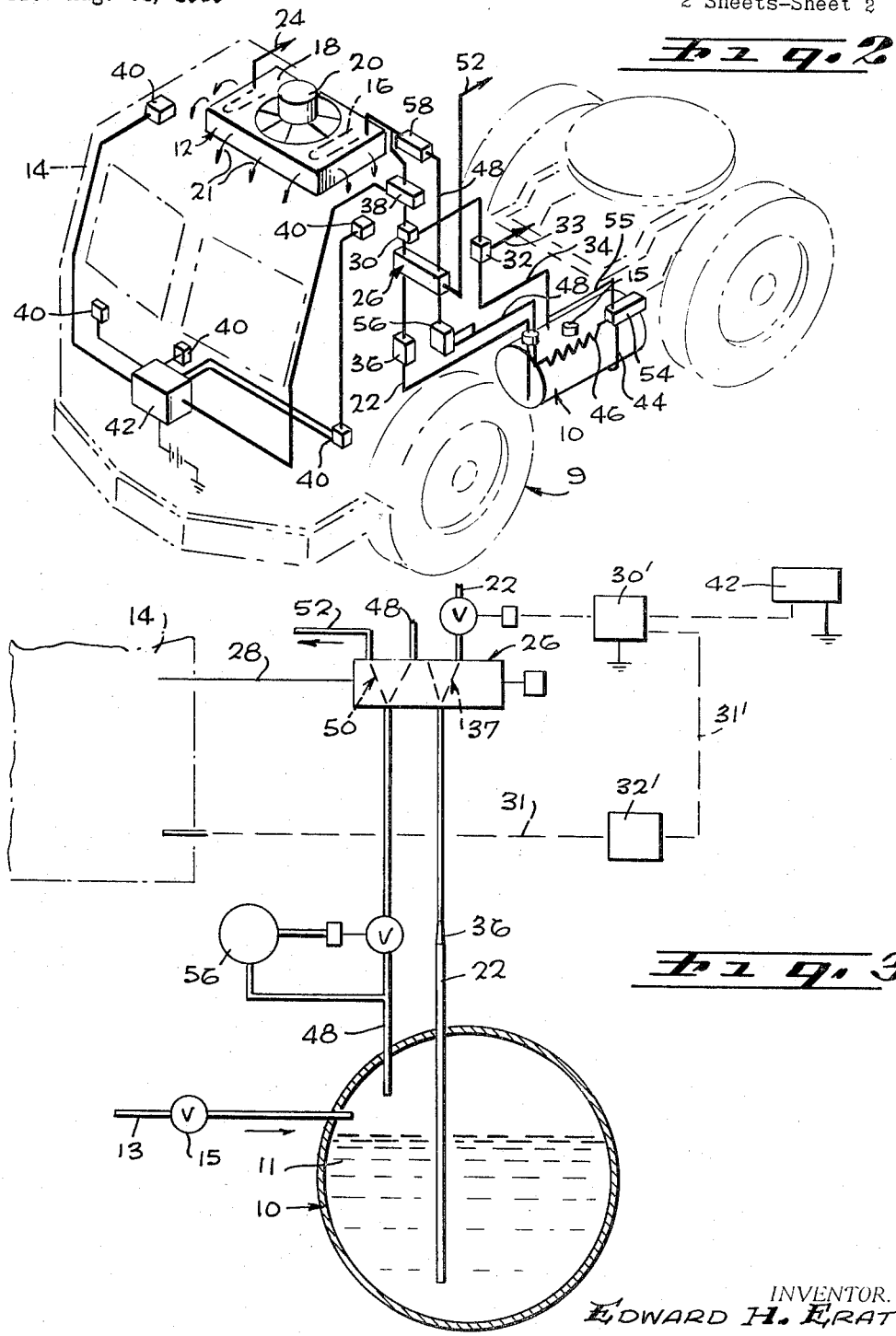
FIG. 2 illustrates the system of FIG. 1, mounted on the tractor of a truck for cooling the operator compartment therein.
FIG. 3 illustrates a modification of the system shown in FIG. 1.

Referring particularly to FIG. 1, the invention system comprises a thermally insulated storage tank 10 for a cryogenic liquid, preferably liquid air indicated at 11, such tank being suitably mounted on the tractor 9 as illustrated in FIG. 2. A cryogenic liquid feed line 13 is provided for introduction of cryogenic liquid or liquid air via valve 15 into the tank 10 as desired.

A heat exchanger indicated at 12 is suitably mounted in the top of the cab 14 of the truck, such heat exchanger comprising a heat exchanger coil 16 passing through ducting 18. A fan 20 is provided for circulating air through the ducting 18 in contact with the coil 16 for cooling and circulation of the air in the cab, as indicated by arrows 21 in FIG. 2.

A cryogenic liquid supply line 22 extends into tank 10 with its lower end positioned below the surface of the cryogenic liquid, e.g., liquid air. The opposite end of the liquid supply line 22 is connected to the heat exchanger coil 16 in the cab, the forward end of such heat exchanger coil being vented at 24 to the atmosphere externally of the cab 14, as best seen in FIG. 2. A manually operated main control valve 26 which is controlled by the operator of the cab by means of a control linkage 28 is provided, valve 26 having dual valve portions 37 and 50 which operate in unison on actuation of the control member 28. The valve portion 37 of the main control valve 26 operates as an on-off valve for control of flow through the liquid supply line 22, and as shown in the dotted line position 37b in FIG. 1, is in the open or operating position for supplying cryogenic liquid to the heat exchanger 12.

A flow control valve 30 is located in the liquid supply line 22, downstream from the main control valve 26, such control valve being pneumatically operated by fluid pressure from tank 10, via the gas line 34. Control valve 30 is actuated by a thermostat valve 32 operatively associated as indicated by dotted line 31 with the interior of the cab 14 whose temperature is to be controlled. When the temperature in cab 14 exceeds a predetermined value, the thermostat automatically opens pressure line 34 in communication with the control valve 30 for operation thereof. The thermostat valve 32 is provided with a vent 33 for relieving the pressure in line 34 between valves 30 and 32, for the purpose noted hereinafter. A flow control limiter 36 is provided in the liquid supply line 22 to limit maximum rate of liquid flow therethrough.

An excess flow control valve 38, shown as a solenoid valve, is also provided in the liquid supply line 22 downstream from the flow control valve 30, valve 38 being actuated by a series of safety switches indicated at 40 which are each mounted on doors and windows of the cab 14 in series, and connected as indicated at 41 to the truck battery 42. As shown, the control valve 38 is solenoid operated, but if desired may be pneumatically operated.

A liquid withdrawal line 44 is provided which communicates with the bottom of the tank 10. A portion of line 44 passes through the vapor space above the cryogenic liquid in the tank 10, through a heat exchanger coil 46 therein. The discharge end of the heat exchange coil 46 is connected to a line 48 in which is located the valve portion 50 of the manually operated main control valve 36. In the line 44, there is provided a pressure actuated valve 54 which is actuated by pressure in the vapor space of the tank 10, via the gas line 55. In the line 48 downstream from the heat exchange coil 46 is a pressure actuated regulating valve 56 which senses through the gas line 57 the pressure in line 48. Line 48 communicates downstream from the main control valve 26 with the liquid supply conduit 22 which discharges into the heat exchanger coil 16 as noted above. In line 48 downstream from the main control valve 26 is a check valve 58 which permits flow of fluid in line 48 only in an upward direction toward the supply line 22, as viewed in FIG. 1.

The cryogenic liquid or liquid air is stored under pressure in the tank 10, such pressure being produced by the slowly boiling liquid. Such pressure is maintained substantially constant by the regulating valves 54 and 56. When the system is not in operation and the main valve 26 is in a position such that the valve portion 37 is in the dotted line position 37a and valve portion 50 is in the dotted line position shown at 50a in FIG. 1, excess gas in line 48 is exhausted to the atmosphere at 52. When the main valve 26 is manually operated to place the system in operation and the valve portion 50 is in the dotted line position indicated at 50b, excess gas in line 48 is exhausted through the liquid supply line 22 and the heat exchanger coil 16, and is vented therefrom to the atmosphere. Also, when main valve 26 is in the operating position, and valve portion 37 is in the position indicated at 37b, gas pressure in the storage tank 10 forces cryogenic liquid or liquid air through supply line 22 into the heat exchanger coil 16 to effect cooling of the air in cab 14, and the vaporized liquid air is discharged into the ambient atmosphere via the vent 24. The air temperature in the cab 14 is maintained constant at a preset value by the thermostatic valve 32 and the control valve 30, all as described in greater detail below.

When the system is activated by manually turning the main valve 26 to the operate position as noted above, either the excess pressure in the storage vessel 10 can be vented via line 48 through the heat exchanger coil 16 or liquid air can be supplied from the storage vessel to the heat exchanger coil 16 at flow rates determined by the thermostatically controlled valve 30. When the temperature in the compartment or cab 14 rises to a predetermined value, the thermostat valve 32 opens the pressure line at 34 to the valve 30 causing operation of such valve, and permits liquid to be delivered to the heat exchanger 12 from the storage vessel. The vent 33 of the thermostatic valve 32 allows pressure on the valve 30 side of the thermostat to be vented to the atmosphere when the thermostat indicates that cooling is no longer required in cab 14. If this vent were not provided in the system shown, pressure on the side of valve 30 from the thermostat 32 would keep valve 30 open, even when the thermostat indicated that the liquid flow to the heat exchanger 12 was to be cut off.

The function of the flow limiter 36 is to keep the flow of liquid gas from the tank 10 to the heat exchanger coil 16 below the rate at which the heat exchanger can vaporize all of the liquid. In the absence of this valve, it would be possible for the system to deliver liquid in uncontrolled amounts to the heat exchanger 16, thus wasting liquid by venting it to the atmosphere outside and essentially minimizing the efficiency of the system. This flow limiter can either be fixed, as in the form of a constriction in the liquid delivery line, as indicated in FIG. 1 or it can be variable, and being controlled by the flow rate through the line 22. Such a variable flow regulator can operate by sensing the flow rate in line 22 and controlling such flow to maintain a maximum level of flow in line 22.

The valve 38 is essentially a safety or lock-out valve. Its function is to prevent the system from operating unless all doors, windows and vents of the cab 14 to be cooled are closed. Without such a valve, it would be possible with a door or window of cab 14 open, for the system to vent all of its liquid through the heat exchanger 12 in a short period of time. The switches 40 are essentially single pole, single throw switches activated by doors, windows and vents of the cab, and unless all of these openings are closed, the switches being in series will prevent the electrical system from operating the valve 38. Thus, valve 38 is normally closed and when all of the vents, windows and door openings are closed the electrical system activates this valve to open it and permit the flow of liquid from the storage vessel 10 into the heat exchanger coil 16. If desired, valve 38 can be pneumatically actuated.

The ball check valve 58 isolates the venting system from the liquid supply system. In the absence of this valve it would be possible for liquid to be delivered from the tank 10 through valve 37, through the thermostatically controlled valve 30, through the solenoid valve 38, and back down into the venting system line 48.

In the system shown in FIG. 1, employing the preferred cryogenic liquid, namely liquid air, the valve 54, the heat exchanger 46 and the valve 56 operate to regulate the concentration of nitrogen and oxygen in the liquid air in the storage vessel 10 in the following way.

Pressure in the tank 10 builds up due to the boiling liquid. This pressure is sensed by the line 55 leading to the valve 54. When the pressure reaches the predetermined value, valve 54 opens and liquid is released from the tank to the heat exchanger coil 46 where it completely evaporates, raising the pressure in the line 48 leading to the valve 56. This increase in pressure opens valve 56 and allows the gas in line 48 to be vented to the atmosphere through valve 50 when that valve is in the off position indicated at 50a, or to the heat exchanger coil 16 when valve 50 is in the operate position, indicated at 50b, as previously noted.

It will be seen that only liquid is ever removed from the tank 10, that is, none of the atmosphere above the liquid is removed. Thus, assuming that the initial concentration of the liquid air 11 is 79% nitrogen and 21% oxygen, liquid of that concentration is taken off through line 44 and completely vaporized in either the heat exchanger coil 46 or the heat exchanger coil 16. Due to the lower boiling temperature of nitrogen, the atmosphere in the tank 10 will be nitrogen rich, due to the selective boiling of nitrogen. However, when liquid is vaporized in the heat exchanger coil 46, nitrogen in the vapor space of tank 10 will be selectively liquefied on heat exchanger coil 46, and flows back into the main body of liquid in tank 10, tending to maintain the concentration of nitrogen and oxygen in the liquid constant. Thus, the function of the main control valve 26 is to supply liquid to the heat exchanger coil 16 when the system is operating. When the system is not operating and valve 26 is in the off position, this valve allows the excess gas vaporized through the system previously described to be vented to the atmosphere at 52. The primary function of this vent is to maintain the pressure constant in the storage vessel 10 to prevent excessive pressures building up.

In those cases where the demand rate for cooling is high enough to lower the pressure over the liquid in the storage vessel 10, heat energy can be supplied to the liquid in tank 10 to cause boiling and thus raise the pressure over the liquid. Thus, as shown in FIG. 1, a small electrical heater coil 60 can be placed in the storage vessel 10 and connected to an electrical source 63 operated by battery 42, as indicated at 62. The flow of current through this heater can be controlled by the thermostatic valve 32, as indicated at 64. Thus, when the cab 14 requires cooling, the thermostatic valve 32 will signal a supply of electrical energy from the electrical source 63 to the heater 60 in the storage tank causing boiling of the liquid therein, thus raising the pressure in the storage vessel 10. It is noted that in this system, the current flow to the heater is not controlled as a function of pressure in the storage vessel. Such a control would be cumbersome and expensive. Thus, when liquid is required in the compartment 14 for cooling and the thermostat 32 turns the liquid delivery system on, it also connects the electrical system to the heater in the storage vessel and regardless of the pressure therein, supplies current at a fairly low predetermined level such that adequate boiling takes place to deliver liquid to the cooling heat exchanger coil 16 at a reasonably low maximum level commensurate with the cooling requirements of the cab 14. However, it will be understood that in usual practice such heater 60 can be omitted from the system.

The system shown in FIG. 1 is designed particularly for the use of liquid air as the refrigerant for cooling occupied compartments. However, in the event that liquid air is not available the system can operate without modification employing, for example, liquid nitrogen. As previously noted, the primary purpose for the inclusion of the system comprising the valves 54 and 56 and heat exchanger coil 46 is to control the concentration of nitrogen and oxygen in the liquid air that is stored in tank 10. When for example, liquid nitrogen is used in the system, this control system can be deleted, but its presence would not in any way affect the operation of the overall system.

However, as illustrated in FIG. 3, if desired, the invention system can be modified to use solely liquid nitrogen as the refrigerant. According to such modification, the concentration control elements including line 44, valve 54 and the heat exchanger 46 of FIG. 1 are eliminated. Referring to FIG. 3, it will be seen that the lower end of the gas line 48 extends into the upper portion of the tank 10 in communication with the vapor space therein above the cryogenic liquid. Thus, the pressure in tank 10 is maintained constant by relieving excess pressure in a manner described above through actuation of valve 56 either to vent excess gas pressure to the atmosphere at 52 when the main control valve 26 is in the off position, or to discharge such excess gas vapors into line 22 and the heat exchanger coil 16 of the cab 14 when the main control valve 26 is in the on position, all as previously described.

Also, it will be noted in FIG. 3 that the flow control valve 30' downstream from the main control valve 26 is actuated as indicated at 31' by a thermostat 32' in accordance with temperature variations in the cab 14, by electrical energy supplied from the battery 42. However, here again, if desired, valve 30' can be actuated pneumatically similarly to valve 30 in FIG. 1. It will be understood that the remainder of the system of FIG. 3 is otherwise the same as that of FIG. 1.

Where the system of FIG. 1 is employed using liquid air as refrigerant, as a further feature of the invention illustrated in FIG. 4, the heat exchanger 12 including its associated elements 16, 18 and 24 can be omitted and the liquid air supply pipe 22 can be made to discharge directly into the cab 14, such as through a distributor member 70. According to this feature, the liquid air is vaporized in the distributor 70, and the cold vaporized air is introduced into the cab 14 and circulates therein with the ambient air inside the cab, increasing the system efficiency.

Similarly, if desired, and as illustrated in FIG. 1, a branch conduit 72 can be connected to liquid supply line 22 just in advance of heat exchanger 12, such conduit extending into the cab 14 and terminating in a distributor fixture 74. Thus, in the system of FIG. 1, if this system employs liquid air as the refrigerant in tank 10, valves 76 and 78 in lines 22 and 72, respectively, can be actuated, if desired, to bypass liquid air in supply line 22 from the heat exchanger to line 72 and through the distributor 74, the liquid air being vaporized therein and discharging directly into the cab 14, as in the embodiment of FIG. 4 described above.

When liquid air is employed as refrigerant, and is vaporized and discharged directly into the cab 14, according to the above described modification of FIG. 1, means (not shown) can be provided automatically to close valve 78 and to open valve 76 so as to discharge liquid air only through the heat exchanger 12 if there is a dangerous accumulation of nitrogen in the liquid air being supplied through line 22. Likewise, a valve 80 in the supply conduit 22 in the embodiment of FIG. 4 can be similarly automatically actuated to close and to shut off the supply of liquid air to element 70 in the event of such an accumulation of nitrogen in the liquid air.

From the foregoing, it is seen that the invention provides a simple inexpensive system for air cooling and air conditioning of passenger compartments of vehicles, employing a relatively inexpensive expendable refrigerant such as liquid air or liquid nitrogen. Such system can be designed and fabricated for installation readily into vehicles such as light airplanes, automobiles, house trailers, and any other vehicle or device to be occupied by people, where an air conditioning capability is required, the system being particularly designed for installation on trucks for air conditioning the operator cab thereof. The invention system avoids the use of heavy conventional expansion-compression refrigeration equipment, and is particularly versatile for use on trucks, where the system can be designed so that the liquid storage tank when empty at a portion of a run can be removed and replaced by a substantially full tank of liquid refrigerant, or the storage tank can be removed when cooling is not required, the remainder of the system adding but little weight to the overall weight of the truck or vehicle.

While I have described particular embodiments of my invention for the purpose of illustration, it should be understood that various modifications and adaptations thereof may be made within the spirit of the invention, and within the scope of the appended claims.

I claim:

1. A cooling system for a compartment of vehicles to be occupied by persons, which comprises in combination an enclosed reservoir containing an expendable liquefied gas refrigerant, a compartment adapted for occupation by persons, a liquid supply conduit one end of which is positioned in said reservoir below the level of liquid gas therein, the opposite end of said conduit being in heat exchange relation with the atmosphere in said compartment, means for sensing and venting excess gas pressure in said reservoir, a control valve in said conduit, and a thermostat for actuating said control valve in response to variations in temperature in said compartment, thereby selectively supplying liquid gas refrigerant to said compartment for heat exchange therein.

2. A cooling system as defined in claim 1, including a truck, said system being mounted on said truck, and said compartment being the operator compartment of said truck.

3. A cooling system as defined in claim 1, including vaporizer means in said compartment, said opposite end of said liquid supply conduit being connected to said vaporizer means for discharging vaporized refrigerant directly into said compartment, to thereby circulate cold refrigerant gas vapors within said compartment.

4. A cooling system for a compartment of vehicles to be occupied by persons, which comprises an combination an enclosed reservoir containing an expendable liquefied gas refrigerant, a compartment adapted for occupation by persons, a heat exchanger in said compartment, a liquid supply conduit, one end of which is positioned in said reservoir below the level of liquid gas therein, the opposite end of said conduit being in communication with said heat exchanger, said heat exchanger discharging to the ambient atmosphere, means for sensing and venting excess gas pressure in said reservoir, a control valve in said conduit, and a thermostat for actuating said control valve in response to variations in temperature in said compartment, thereby selectively supplying liquid gas refrigeerant to said heat exchanger for evaporation therein, and cooling the air in said compartment.

5. A cooling system as defined in claim 4, including conduit means, one end of which is connected to said supply conduit in advance of said heat exchanger, the other end of said conduit means discharging directly into said compartment, and valve means selectively permitting bypassing fluid from said supply conduit through said conduit means for discharge directly into said compartment, and vaporizer means connected to said other end of said conduit means.

6. A cooling system as defined in claim 1, including an on-off valve in said supply conduit to place said system in the operative and inoperative condition, said excess gas pressure sensing and venting means including a second conduit communicating at one end with said reservoir and at its other end with said liquid supply conduit, and valve means in said second conduit, and operative in response to a predetermined pressure therein selectively to vent gas in said second conduit to the atmosphere, and to permit discharge of gas through said second conduit, into said supply conduit.

7. A cooling system as defined in claim 6, said valve means in said second conduit including a valve actuating to open in response to a predetermined pressure in said second conduit, and a valve downstream of said last mentioned valve, and manually operable selectively to vent gas in said second conduit to the atmoshpere when said system is in the inoperative condition.

8. A cooling system as defined in claim 7, said valve operable to vent gas to the atmosphere and said on-off valve in said supply conduit being manually operable in unison to close said supply conduit and place said system in the inoperative condition and to vent said second conduit to the amosphere, and to open said supply conduit and place said system in operation and to permit discharge of gas through said second conduit and into said supply conduit.

9. A cooling system as defined in claim 1, including means for maintaining substantially constant the composition of liquid air in said reservoir when liquid air is employed as the refrigerant..

10. A cooling system as defined in claim 1, including an on-off valve in said supply conduit to place said system in the operative and inoperative condition, said excess gas pressure sensing and venting means including a second conduit communicating at one end with the liquid in said reservoir and at its other end with said supply conduit, a portion of said second conduit passing through said enclosed reservoir above the liquid therein, a heat exchanger coil in said portion of said second conduit, a pressure actuated valve in said second conduit in advance of said heat exchanger, and operative to open at a preselected pressure to discharge liquid from said reservoir through said heat exchanger coil, and valve means in said second conduit downstream from said heat exchanger coil, and operative in response to a predetermined pressure selectively to vent gas in said second conduit to the atmosphere, and to permit discharge of gas through said second conduit into said supply conduit.

11. A cooling system as defined in claim 1, including flow limiter means in said liquid supply conduit, a lockout valve in said liquid supply conduit, and switch means associated with said lockout valve for actuating said valve to close same in response to the opening of windows, doors and the like in said compartment.

12. A cooling system as defined in claim 6, including check valve means in said second conduit downstream from said selectively operable valve means therein, to prevent return of liquid from said supply conduit through said second conduit to said reservoir.

13. A cooling system for the operator compartment of a truck-trailer cab, which comprises an enclosed tank containing liquid air, a truck mounting said tank of liquid air, an operator cab in said truck, a heat exchanger coil in said cab, a liquid supply conduit, one end of which is positioned in said tank below the level of liquid air therein, the opposite end of said conduit being in communication with one end of said heat exchanger coil, the opposite end of said heat exchanger coil discharging to the atmosphere externally of said cab, a control valve in said supply conduit, a thermostat for actuating said control valve in response to variations in temperature in said cab, thereby selectively supplying liquid air to said heat exchanger coil for evaporation therein, with discharge of the resulting air from said heat exchanger coil to the atmosphere, an on-off valve in said supply conduit upstream from said control valve, to place said system in the operative and inoperative condition, a second conduit communicating at its lower end with the liquid air-containing portion of said tank, and at its upper end with said liquid air supply conduit downstream therein from said control valve, a portion of said second conduit passing through said tank in the vapor space above the liquid air therein, a second heat exchanger coil in said portion of said second conduit, a pressure actuated valve in said second conduit in advance of said second heat exchanger coil, and operative to open at a selected pressure to discharge liquid air from said tank through said second heat exchanger coil, a valve in said second conduit downstream from said second heat exchanger coil, said valve actuating to open in response to a predetermined pressure in said second conduit downstream from said second heat exchanger coil, a second valve in said second conduit downstream of said last mentioned valve, said second valve being operable to vent air in said second conduit to the atmosphere, said second valve and said on-off valve in said supply conduit being manually operable in unison to close said supply conduit and place said system in the inoperative condition and to vent said second conduit to the atmosphere, and to open said supply conduit and place said system in operation and to permit discharge of gas through said second conduit and into said supply conduit and heat exchanger coil in said cab, a flow limiter in said supply conduit upstream from said on-off valve therein, a safety valve in said supply conduit downstream from said control valve, switches associated with the doors and windows in said cab, said switches being connected in series and associated with said safety valve to actuate said safety valve and close said supply conduit when a window or door in said cab is open, a check valve in said second conduit downstream from said second valve therein, and preventing flow of liquid air from said supply conduit and through said second conduit to said tank.

(References on following page)

References Cited by the Examiner

UNITED STATES PATENTS

| | | | |
|---|---|---|---|
| 966,076 | 8/1910 | Bobrick | 62—239 |
| 2,895,313 | 7/1959 | Flick | 62—244 |
| 2,958,482 | 11/1960 | Summers | 62—52 X |
| 3,096,626 | 7/1963 | Morrison | 62—64 X |
| 3,127,755 | 4/1964 | Hemery | 62—267 |
| 3,205,670 | 9/1965 | Carolan | 62—52 |
| 3,211,076 | 11/1965 | Chancellor et al. | 62—244 |
| 3,241,329 | 3/1966 | Fritch et al. | 62—239 |

LLOYD L. KING, *Primary Examiner.*

Disclaimer 3,304,739.—*Edward H. Erath*, Los Angeles, Calif. COOLING SYSTEM FOR PASSENGER COMPARTMENTS OF VEHICLES. Patent dated Feb. 21, 1967. Disclaimer filed Oct. 26, 1971, by the assignee, *McDonnell Douglas Corporation*.

Hereby enters this disclaimer to claim 1 of said patent.

[*Official Gazette March 7, 1972.*]